(12) United States Patent
Grymel et al.

(10) Patent No.: US 12,195,299 B2
(45) Date of Patent: Jan. 14, 2025

(54) DEVICE FOR WINDING UP AND UNWINDING AN ELONGATED FLEXIBLE ELEMENT

(71) Applicant: Ford Global Technologies, LLC, Dearborn, MI (US)

(72) Inventors: Stephan A. Grymel, Cologne (DE); Bruno Alves, Huerth (DE); Thomas Pulheim, Cologne (DE); Lieven Werner, Norvenich Dorweiler (DE); Werner Jakobs, Bergisch Gladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 266 days.

(21) Appl. No.: 18/075,675

(22) Filed: Dec. 6, 2022

(65) Prior Publication Data
US 2023/0174340 A1 Jun. 8, 2023

(30) Foreign Application Priority Data
Dec. 6, 2021 (DE) .......................... 102021132045.3

(51) Int. Cl.
*B65H 75/44* (2006.01)
*B60L 53/18* (2019.01)

(52) U.S. Cl.
CPC .......... *B65H 75/4452* (2013.01); *B60L 53/18* (2019.02); *B65H 75/4402* (2013.01); *B65H 2701/33* (2013.01); *B65H 2701/34* (2013.01)

(58) Field of Classification Search
CPC ............ B65H 75/4402; B65H 75/4452; B65H 2701/34; B60L 53/18; B60L 53/30
See application file for complete search history.

(56) References Cited

U.S. PATENT DOCUMENTS

2010/0277127 A1* 11/2010 Flack .................... B60L 53/302
254/134.3 R
2012/0249066 A1* 10/2012 Ichikawa .................. H02J 7/04
320/109
(Continued)

FOREIGN PATENT DOCUMENTS

CN 105752765 A 7/2016
DE 2159496 C2 4/1982
(Continued)

*Primary Examiner* — Sang K Kim
(74) *Attorney, Agent, or Firm* — Vichit Chea; Price Heneveld LLP

(57) ABSTRACT

A device for winding up and unwinding an elongated flexible element having a free end and a spatially fixed end. The elongated flexible element is divided over its length at least into a use portion and a compensation portion, wherein the use portion has the free end and the compensation portion has the spatially fixed end. The device includes a rotatable drum configured on its circumference to wind up and unwind at least the use portion in a first winding plane, wherein the end of the compensation portion is spatially fixed relative to the drum. The elongated flexible element in the transition from the use portion to the compensation portion is fixed at a fastening point to the drum, and when the drum is rotated the compensation portion is coiled up and uncoiled in the form of at least one looped portion in a second winding plane.

14 Claims, 3 Drawing Sheets

(56) References Cited

U.S. PATENT DOCUMENTS

| | | | | |
|---|---|---|---|---|
| 2013/0020426 A1* | 1/2013 | Abri | ............... | B65H 75/4452 |
| | | | | 242/388.6 |
| 2014/0001300 A1* | 1/2014 | Ichihara | ............... | H02G 11/00 |
| | | | | 242/388.91 |
| 2019/0214807 A1* | 7/2019 | Owens | ............... | B65H 75/446 |
| 2020/0180455 A1* | 6/2020 | Mailloux | ............... | B60L 53/18 |

FOREIGN PATENT DOCUMENTS

| | | |
|---|---|---|
| JP | 2015182838 A | 10/2015 |
| WO | 2017216454 A1 | 12/2017 |

* cited by examiner

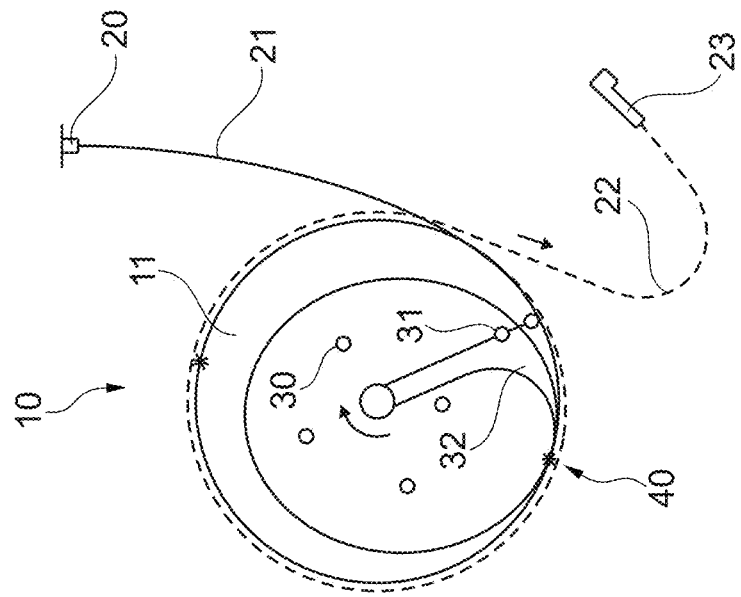
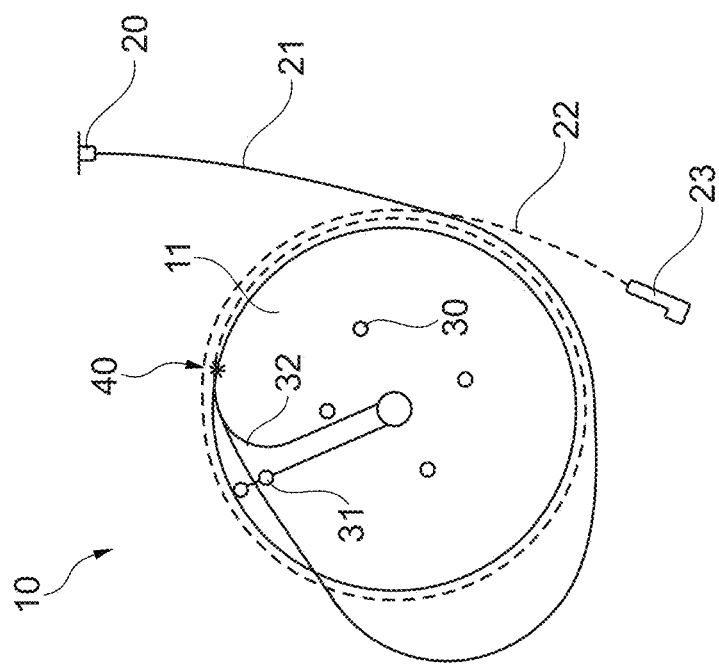

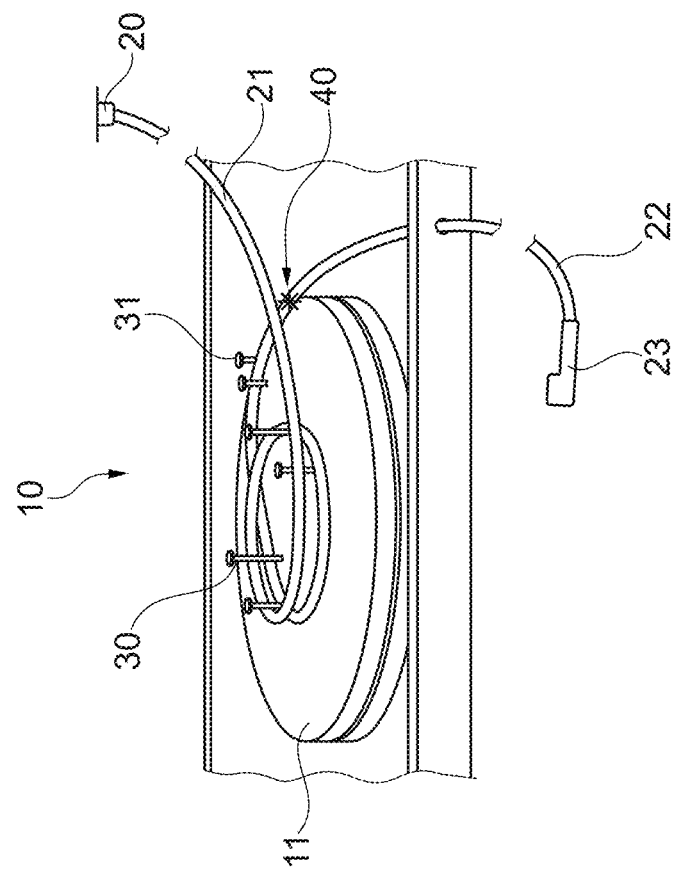
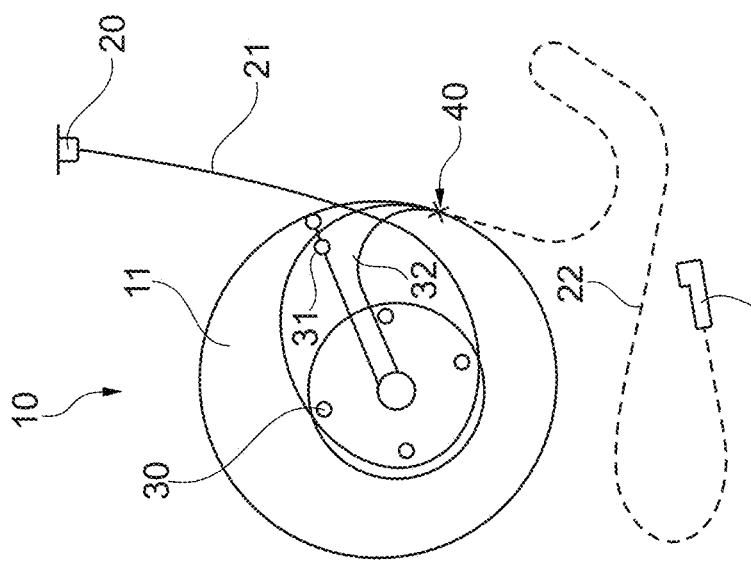
Fig. 4
Fig. 3

DEVICE FOR WINDING UP AND UNWINDING AN ELONGATED FLEXIBLE ELEMENT

CROSS-REFERENCE TO RELATED APPLICATION

This application claims foreign priority benefits under 35 U.S.C. § 119(a)-(d) to German Patent Application No. 102021132045.3 filed on Dec. 6, 2021, which is hereby incorporated by reference in its entirety.

FIELD OF THE DISCLOSURE

The present disclosure generally relates to winding devices, and more particularly relates to a device for winding up and unwinding an elongated flexible element having a free end and a spatially fixed end.

BACKGROUND OF THE DISCLOSURE

Elongated flexible elements, for example, electrical cables or hoses may be wound up to save space when not in use. In order to put the respective elongated flexible element to use, it may be unwound in a device so as to be able to use the full length thereof. Rotatable drums, onto which the elongated flexible element is wound with one or more windings, are often used with such devices for winding up and unwinding elongated flexible elements. The elongated flexible element which can be unwound has a free end which is typically provided with a connection element or metering element. In the case of an electrical cable this is, for example, an electrical plug or a plug socket, while in the case of a hose a metering element is provided for removing a fluid. The fluid may be, for example, a liquid or a gas such as air.

The connection to a source is typically located at the other end of the elongated flexible element which opposes the free end. With an electrical cable this is, for example, typically a power source, while in the case of a hose this is a fluid source. If a device having an electrical charging cable which can be coiled up, however, is fixedly integrated in an electric vehicle, for example, wherein the device can be located in particular in the boot, this end of the elongated flexible element is not attached to a power source but to a battery charging system for charging up a rechargeable battery of the vehicle. In this case, the connection element at the free end of the charging cable serves for connecting to a power source. The other end of the elongated flexible element which opposes the free end having the connection element typically is spatially fixed and is stationary relative to the rotatable drum. The elongated flexible element extends in a first portion from the fixed end to the drum before it is wound up thereon in a second portion. If the second portion having the free end is unwound from the drum, the drum rotates and the first portion may be twisted about the longitudinal axis of the elongated flexible element due to its fixed end. In this manner, the connection at the fixed end may be subjected to twisting which can lead to negative stress and even damage to the connection.

In order to prevent twisting, a connection coupling which permits a twisting of the elongated flexible element relative to the fixed end may be used. Such coupling systems, however, usually are very elaborate and susceptible to damage. In the case of hoses for conducting a fluid, for example, there is the risk of leakage, while in electrical cables high contact resistances involve risks to the user.

The field of devices for winding up and unwinding cables and hoses still leaves room for enhancement. This is the case, in particular, in electrical charging cables for use during the charging process of electric vehicles. Primarily, cables with large external diameters in the order of magnitude of at least 2 cm are used for rapid charging. These cables are very stiff and the twisting thereof brings about a high level of torque on the connection at a spatially fixed end.

It would be desirable to provide for a device for winding up and unwinding an elongated flexible element that avoids twisting without elaborate coupling systems.

SUMMARY OF THE DISCLOSURE

According to a first aspect of the present disclosure, a device for winding up and unwinding an elongated flexible element having a free end and a spatially fixed end, wherein the elongated flexible element is divided over its length at least into a use portion and a compensation portion, wherein the use portion has the free end and the compensation portion has the spatially fixed end of the elongated flexible element is provided. The device including a rotatable drum configured on its circumference to wind up and unwind at least the use portion in a first winding plane, wherein the spatially fixed end of the compensation portion is spatially fixed relative to the drum and the elongated flexible element in the transition from the use portion to the compensation portion is fixed at a fastening point to the drum, wherein when the drum is rotated the compensation portion is coiled up and uncoiled in the form of at least one looped portion in a second winding plane.

According to a second aspect of the present disclosure, a device for winding up and unwinding an elongated flexible element having a free end and a spatially fixed end, wherein the elongated flexible element is divided over its length at least into a use portion and a compensation portion, wherein the use portion has the free end and the compensation portion has the spatially fixed end of the elongated flexible element is provided. The device includes a rotatable drum configured on its circumference to wind up and unwind at least the use portion in a first winding plane, wherein the spatially fixed end of the compensation portion is spatially fixed relative to the drum and the elongated flexible element in the transition from the use portion to the compensation portion is fixed at a fastening point to the drum, wherein when the drum is rotated the compensation portion is coiled up and uncoiled in the form of at least one looped portion in a second winding plane, wherein the elongated flexible element is an electrical cable or a hose, wherein the second winding plane runs parallel to the first winding plane, wherein starting from the fastening point, the use portion in the first winding plane and the compensation portion in the second winding plane have opposing winding directions. The device also includes a winding aid in the second winding plane, the at least one looped portion of the compensation portion being coiled up about the winding aid when the use portion is unwound from the circumference of the drum.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 1 is a schematic view of the functional principle of a winding device according to one embodiment with the use portion wound up, in a plan view;

FIG. 2 is a winding device according to FIG. 1 with a partially unwound use portion;

FIG. 3 is a winding device according to FIG. 1 with a fully unwound use portion;

FIG. 4 is a schematic three-dimensional view of a winding device according to FIG. 1.

DETAILED DESCRIPTION OF PREFERRED EMBODIMENTS

Figure 5:
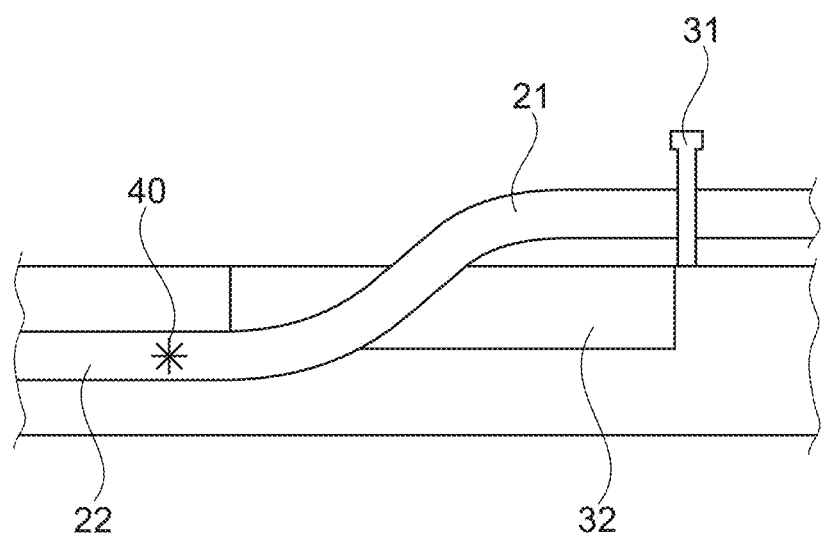
FIG. 5 is a schematic enlarged view of the transition of an elongated element between two winding planes.

In the various figures, the same parts are always provided with the same reference numerals which is why generally these parts are only described once.

The functional principle of the winding device set forth in the disclosure is explained with reference to the schematic views of FIGS. 1-5. In this case, FIG. 1 shows a plan view of one embodiment of a device 10 for winding up and unwinding an elongated flexible element. The elongated flexible element in this case is divided over its length into a use portion 22 which is shown in dashed lines and compensation portion 21 which is shown by a solid line. The elongated flexible element is connected at a fastening point 40 to a rotatable drum 11, a front face thereof being able to be seen in the plan view of FIG. 1. The compensation portion 21 extends between this fastening point 40 and a spatially fixed end 20 of the compensation portion which is fixedly connected to another structure. This structure is not shown in FIG. 1 and can be formed, for example, by an electric vehicle, a power source or an electric charging station, when the elongated flexible element is an electrical cable. In the case of an elongated flexible element in the form of a hose, the structure to which the spatially fixed end 20 is attached, for example, is a fluid source for a liquid or a gas. The spatially fixed end 20 in this case is fixed relative to the rotatable drum 11.

The use portion 22 extends between the fastening point 40 and a free end 23 of the elongated flexible element to which a connection element is attached. In the exemplary embodiment illustrated in the drawing figures, this connection element is by way of example an electronic plug which is attached to the elongated flexible element, such as for example a charging cable. The use portion 22 is wound up onto the circumference of the drum 11, wherein in the situation illustrated in FIG. 1 it is almost fully wound up onto the drum 11 so that it is in a non-use state. The use portion 22 in this case is wound up in a first winding plane.

The compensation portion 21 is relatively long and forms in this state a large loose loop which is in a second winding plane. In this case, a loop does not necessarily have to be closed but at least in the unwound state it can also be an open loop which when wound up is tightened to form one or more loops. The second winding plane runs parallel to the first winding plane, wherein in the exemplary embodiment of the figures it runs above the first winding plane of the drum 11. This is clear, in particular, in the three-dimensional view shown in FIG. 4.

A winding aid for the compensation portion 21 is attached to a front face of the drum 11, wherein the winding aid includes four pins, in the example shown, which protrude from the front face, which can also be denoted as the upper face. One of these pins is denoted as a winding aid by way of example with the reference numeral 30. Optionally, an outer boundary which holds the compensation portion 21 in the second winding plane is also provided. This boundary, for example in the form of an edging or a housing, is not shown in detail in the figures. The widened loop of the compensation portion 21 in this case remains in the second winding plane and does not slip into the first winding plane for the use portion 22 even if the radius of the loop is greater than the radius of the drum 11.

The drum 11 also has a guide 31 which in the schematic view of the figures is formed in a simplified manner by two pins, in one example. The elongated flexible element is guided between the two pins, whereby starting from the fastening point 40 the compensation portion 21 is guided from the first winding plane on the circumference of the drum 11 into the second winding plane on the front face of the drum 11. The guide 31 is located on the edge of the front face of the drum 11. In order to transfer the elongated flexible element as far as possible without kinks between the winding planes, the drum 11 is provided with an indentation 32 in the region of the transition. The indentation 32 extends between the circumference and the front face of the drum, such that the elongated flexible element is guided from the circumference of the drum 11 through the indentation 32 onto the front face of the drum 11.

A schematic view of the indentation 32 in a radial view of the circumference of the drum 11 can be seen from FIG. 5. The indentation 32 can have a rounding along which the elongated flexible element extends. The fastening point 40 is preferably located at one end of the this rounding, such that the elongated flexible element is guided from the fastening point 40 directly to the rounding.

FIG. 1 shows a situation in which the use portion 22 is wound up almost fully in its first winding plane onto the circumference of the drum 11. In this state, the compensation portion 21 is relaxed and is located in a large loop in the second winding plane. FIG. 2 shows a situation in which the use portion 22 is partially unwound from the circumference of the drum 11, which is shown by an arrow. In this case the drum 11 rotates according to an arrow direction, which is also shown. By the rotation of the fastening point 40 about the rotational axis of the drum 11 the loop of the compensation portion 21 is tightened, whereby the twisting of the compensation portion 21 is compensated. In this case, the loop is tightened about the winding aid 30.

It may be derived from FIG. 3 that when the use portion 22 is fully unwound, a plurality of loops which are wound around the winding aid 30 have been formed in the compensation portion 21. FIG. 4 shows a schematic three-dimensional view of a device 10 in the situation of FIG. 3. From the situation of FIG. 1 to the situation of FIG. 3, therefore, a loop in the compensation portion 21 has become smaller or a plurality of loops have been formed. When the use portion 22 is wound up this process is reversed.

It should be mentioned that the features and measures set forth individually in the following description can be combined together in any technically expedient manner and disclose further embodiments of the disclosure. The description characterizes and specifies the device, in particular, additionally in combination with the figures.

The device according to the disclosure serves for winding up and unwinding in a space-saving manner an elongated flexible element having a free end and a spatially fixed end. "Spatially fixed" means in this case that the relevant end cannot move freely but at least its spatial position is fixed, so that for example it cannot rotate about its axis. In some circumstances, its position is also stationary when the spatially fixed end is fixed, for example, to a stationary device. According to the disclosure, the elongated flexible element is divided over its length at least into a use portion and a compensation portion, wherein the use portion has the free end while the spatially fixed end is provided on the compensation portion. The elongated flexible element, in particular, is an electrical cable or a hose. In the case of a cable, a connection element, for example an electrical plug or a plug socket, is attached to the free end thereof. In the case of a hose, the connection element can be configured as a metering element. In one embodiment, the outer diameter of the elongated flexible element is greater than 1 cm, in particular greater than 2 cm. In the case of such dimensions, the elongated flexible element can be subjected to particularly significant twisting so that the device can be used particularly advantageously in such elongated flexible elements.

The device provides a rotatable drum which is configured on its circumference to wind up and unwind at least the use portion in a first winding plane, wherein the end of the compensation portion is spatially fixed relative to this drum. The elongated flexible element thus has overall two ends, a free end and an opposing end which is spatially fixed relative to the drum, i.e., it is stationary relative to the drum and does not move therewith. The elongated flexible element in this case is divided over its length into two portions having different functions. A use portion is wound up and unwound for using the elongated flexible element, while the compensation portion serves for compensating for the twisting produced thereby in the element.

The elongated flexible element in the transition from the use portion to the compensation portion is fixed at a fastening point to the drum, and when the drum is rotated the compensation portion can be coiled up and uncoiled in the form of at least one looped portion in a second winding plane. If the use portion is unwound from the drum, for example, the fastening point rotates about the rotational axis of the drum. Since the end of the compensation portion is stationary relative to the drum, this leads to a twisting of the compensation portion about the longitudinal axis of the element. Due to the construction of the device, however, the spatially fixed end is not subjected to any torque since the compensation portion in the form of at least one looped portion can be coiled up in a second winding plane. To this end, the compensation portion has a corresponding length which permits at least one looped portion to be formed. The twisting of the element is thus converted into at least one looped portion, whereby less torque or even no torque is transmitted to the fixed end and a connection at that point. When the use portion is coiled up and uncoiled, the looped portion or the number of looped portions is increased and reduced in the compensation portion.

In one embodiment, the second winding plane runs parallel to the first winding plane.

This has the advantage that the two winding planes can be produced as far as possible in a space-saving manner. Moreover, the transition of the elongated flexible element from the first winding plane into the second winding plane can be designed in a simple manner without elaborate deflections. For example, the second winding plane is located on a front face of the drum.

Moreover, in one embodiment, starting from the fastening point, the use portion in the first winding plane and the compensation portion in the second winding plane have opposing winding directions. This also permits a simple transition of the elongated flexible element from the first winding plane into the second winding plane, wherein the compensation portion is wound up when the use portion is unwound. If the use portion is wound up again, however, the compensation portion is unwound. For winding up the use portion, the drum preferably can have a drive which is designed to be driven manually or by motor. The winding up and unwinding of the compensation portion, however, is carried out passively as a result of the movement of the fastening point on the drum.

The winding of the compensation portion in the second winding plane, in a manner which is space-saving and as far as possible knot-free, can be assisted by different features. For example, the second winding plane has a winding aid, the at least one looped portion of the compensation portion being coiled up about the winding aid when the use portion is unwound from the circumference of the drum. When the looped portion is tightened or wound up to form a plurality of looped portions, the looped portions are thus restricted on the inside by a winding aid. This winding aid can be formed, for example, by a continuous boundary wall or individual boundary elements. For example, a plurality of pins which are arranged geometrically relative to one another are relevant as boundary elements, such that the compensation portion is wound up around the pins. Preferably, at least two pins are provided, wherein a higher number of pins improves the winding of the compensation portion. For example, a plurality of pins are arranged in a polygon or circle.

Moreover, the second winding plane can have an outer boundary which holds the compensation portion inside the second winding plane. This is important, in particular, when the at least one looped portion of the compensation portion widens to a maximum extent when unwound in the second winding plane. So that the compensation portion does not leave the second winding plane, it is prevented from doing so by the outer boundary. This outer boundary can in turn be a continuous wall which forms a type of housing for the second winding plane. However, only individual boundary elements which are arranged geometrically relative to one another can be used here, such that they hold the compensation portion in the second winding plane.

Corresponding guides are preferably provided in order to transfer the elongated flexible element from the first winding plane into the second winding plane and vice versa, the elongated flexible element being guided in the guides.

According to one embodiment, the elongated flexible element thus runs in at least one guide, the elongated flexible element being guided therethrough in the transition between the first winding plane and the second winding plane.

The fastening point in the transition between the use portion and the compensation portion is preferably located on the circumference of the drum. Both portions then run at the fastening point tangentially to the circumference of the drum, wherein the compensation portion is transferred into the second winding plane in the vicinity of the fastening point.

The device can be used in different fields. For example, the device is integrated in an electric vehicle and has an electrical charging cable as the elongated flexible element. This charging cable can be unwound by use of the device very easily for use, while when not in use it is wound up again onto the drum. Thus, an electric vehicle having a device is also encompassed by the disclosure, wherein the spatially fixed end of the compensation portion is fixedly connected to a corresponding battery charging system of the vehicle for charging rechargeable batteries of the electric vehicle. The device can also be integrated in a stationary electric charging station for charging an electric vehicle. In such a case, the fixed end of the compensation portion is fixedly connected to a power source.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A device for winding up and unwinding an elongated flexible element having a free end and a spatially fixed end, wherein the elongated flexible element is divided over its length at least into a use portion and a compensation portion, wherein the use portion has the free end and the compensation portion has the spatially fixed end of the elongated flexible element, the device comprising:

a rotatable drum configured on its circumference to wind up and unwind at least the use portion in a first winding plane, wherein the spatially fixed end of the compensation portion is spatially fixed relative to the drum and the elongated flexible element in the transition from the use portion to the compensation portion is fixed at a fastening point to the drum, wherein when the drum is rotated the compensation portion is coiled up and uncoiled in the form of at least one looped portion in a second winding plane, wherein the second winding plane runs parallel to the first winding plane, and wherein starting from the fastening point, the use portion in the first winding plane and the compensation portion in the second winding plane have opposing winding directions.

2. The device according to claim 1, wherein the elongated flexible element is an electrical cable or a hose.

3. The device according to claim 1, wherein an outer diameter of the elongated flexible element is greater than 1 cm.

4. The device according to claim 3, wherein the outer diameter of the elongated flexible element is greater than 2 cm.

5. The device according to claim 1 further comprising a winding aid in the second winding plane, the at least one looped portion of the compensation portion being coiled up about the winding aid when the use portion is unwound from the circumference of the drum.

6. The device according to claim 1, wherein the second winding plane has an outer boundary which holds the compensation portion inside the second winding plane.

7. The device according to claim 1, wherein the fastening point is located on the circumference of the drum.

8. The device according to claim 1, wherein the device is integrated in an electric vehicle or a stationary electric charging station for charging the electric vehicle.

9. A device for winding up and unwinding an elongated flexible element having a free end and a spatially fixed end, wherein the elongated flexible element is divided over its length at least into a use portion and a compensation portion, wherein the use portion has the free end and the compensation portion has the spatially fixed end of the elongated flexible element, the device comprising:

a rotatable drum configured on its circumference to wind up and unwind at least the use portion in a first winding plane, wherein the spatially fixed end of the compensation portion is spatially fixed relative to the drum and the elongated flexible element in the transition from the use portion to the compensation portion is fixed at a fastening point to the drum, and wherein when the drum is rotated the compensation portion is coiled up and uncoiled in the form of at least one looped portion in a second winding plane;

and at least one guide, wherein the elongated flexible element runs in the at least one guide, the elongated flexible element being guided therethrough in the transition between the first winding plane and the second winding plane.

10. A device for winding up and unwinding an elongated flexible element having a free end and a spatially fixed end, wherein the elongated flexible element is divided over its length at least into a use portion and a compensation portion, wherein the use portion has the free end and the compensation portion has the spatially fixed end of the elongated flexible element, the device comprising:

a rotatable drum configured on its circumference to wind up and unwind at least the use portion in a first winding plane, wherein the spatially fixed end of the compensation portion is spatially fixed relative to the drum and the elongated flexible element in the transition from the use portion to the compensation portion is fixed at a fastening point to the drum, wherein when the drum is rotated the compensation portion is coiled up and uncoiled in the form of at least one looped portion in a second winding plane, wherein the elongated flexible element is an electrical cable or a hose, wherein the second winding plane runs parallel to the first winding plane, wherein starting from the fastening point, the use portion in the first winding plane and the compensation portion in the second winding plane have opposing winding directions; and a winding aid in the second winding plane, the at least one looped portion of the compensation portion being coiled up about the winding aid when the use portion is unwound from the circumference of the drum.

11. The device according to claim 10, wherein the second winding plane has an outer boundary which holds the compensation portion inside the second winding plane.

12. The device according to claim 10 further comprising at least one guide, wherein the elongated flexible element runs in the at least one guide, the elongated flexible element being guided therethrough in the transition between the first winding plane and the second winding plane.

13. The device according to claim 10, wherein the fastening point is located on the circumference of the drum.

14. The device according to claim 10, wherein the device is integrated in an electric vehicle or a stationary electric charging station for charging the electric vehicle.

* * * * *